(12) United States Patent
Danziger

(10) Patent No.: US 7,914,075 B2
(45) Date of Patent: Mar. 29, 2011

(54) INFANT CAR SEAT COVER

(75) Inventor: Katie Danziger, Old Greenwich, CT (US)

(73) Assignee: Nomie Baby LLC, New York, NY (US)

( * ) Notice: Subject to any disclaimer, the term of this patent is extended or adjusted under 35 U.S.C. 154(b) by 0 days.

(21) Appl. No.: 12/454,296

(22) Filed: May 15, 2009

(65) Prior Publication Data

US 2010/0237670 A1    Sep. 23, 2010

Related U.S. Application Data

(60) Provisional application No. 61/210,640, filed on Mar. 19, 2009.

(51) Int. Cl.
*A47C 31/11* (2006.01)

(52) U.S. Cl. .................................. 297/219.12

(58) Field of Classification Search .............. 297/219.12
See application file for complete search history.

(56) References Cited

U.S. PATENT DOCUMENTS

| | | | |
|---|---|---|---|
| D275,634 S | 9/1984 | Schutz | |
| D283,475 S | 4/1986 | Reece | |
| D294,210 S | 2/1988 | Rhodes et al. | |
| 4,761,032 A | 8/1988 | Sanchez et al. | |
| 4,883,701 A | 11/1989 | Rankin et al. | |
| 4,885,200 A | 12/1989 | Perdelwitz, Jr. et al. | |
| 4,891,454 A | 1/1990 | Perdelwitz, Jr. et al. | |
| 4,892,769 A * | 1/1990 | Perdelwitz et al. | 297/219.12 X |
| D313,723 S | 1/1991 | Rankin et al. | |
| D347,737 S | 6/1994 | Allard et al. | |
| D388,998 S | 1/1998 | Dubiel | |
| 6,274,520 B1 * | 8/2001 | Cordell | 442/381 |
| 6,428,098 B1 * | 8/2002 | Allbaugh | 297/219.12 |
| 6,959,963 B2 | 11/2005 | Hunter et al. | |
| D525,067 S | 7/2006 | Miller | |
| 7,341,011 B2 * | 3/2008 | Pines et al. | 297/219.12 X |
| 7,537,284 B1 * | 5/2009 | Antorcha | 297/219.12 |
| 7,568,762 B2 * | 8/2009 | Paulson | 297/219.12 |
| 2001/0048235 A1 * | 12/2001 | Hartranft | 297/219.12 |
| 2008/0150335 A1 * | 6/2008 | Pines et al. | 297/219.12 |
| 2009/0015046 A1 * | 1/2009 | McClintock et al. | 297/219.12 |

* cited by examiner

*Primary Examiner* — Rodney B White
(74) *Attorney, Agent, or Firm* — Abelman, Frayne & Schwab

(57) ABSTRACT

A washable infant car seat cover adapted to removably fit over and onto an infant car seat which includes a safety belt, the cover including a central part with a central opening for passage of the safety belt and an elastic peripheral edge.

8 Claims, 5 Drawing Sheets

Figure 1:
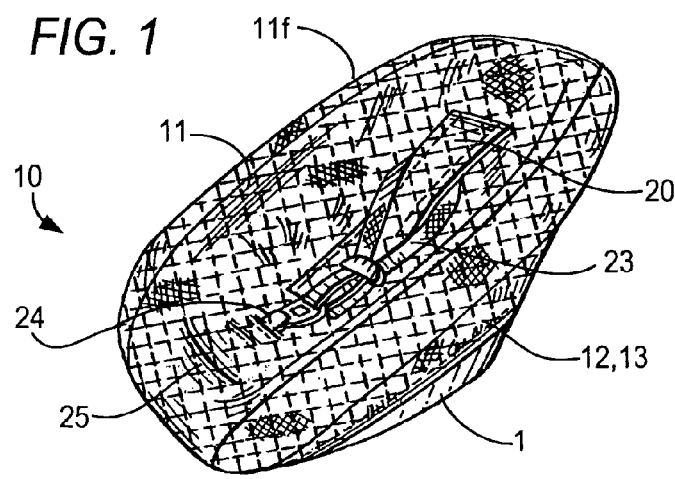

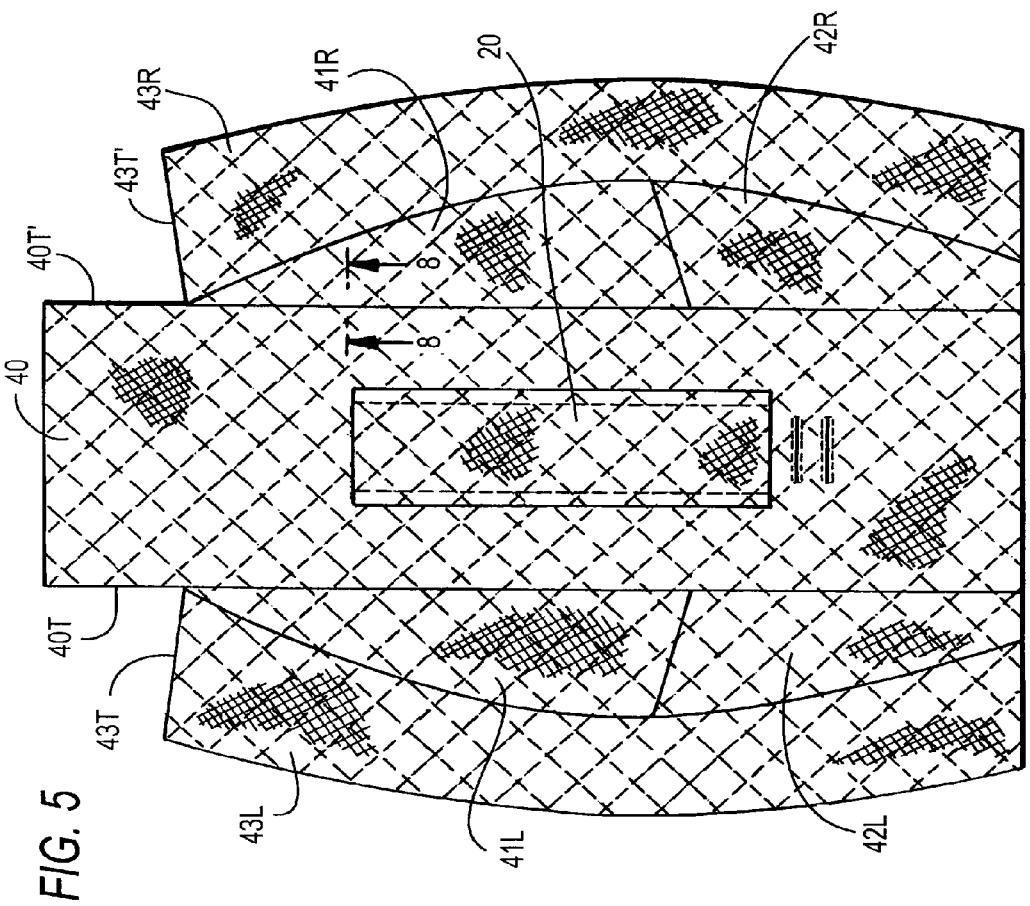

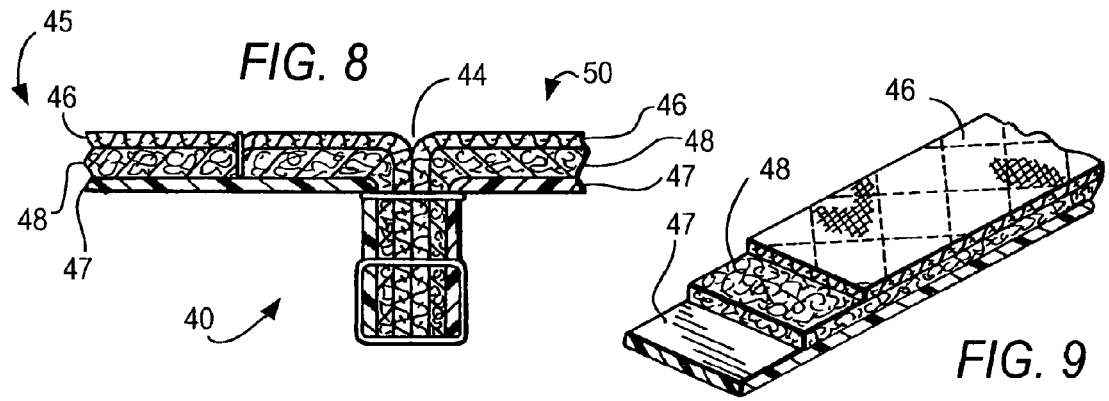
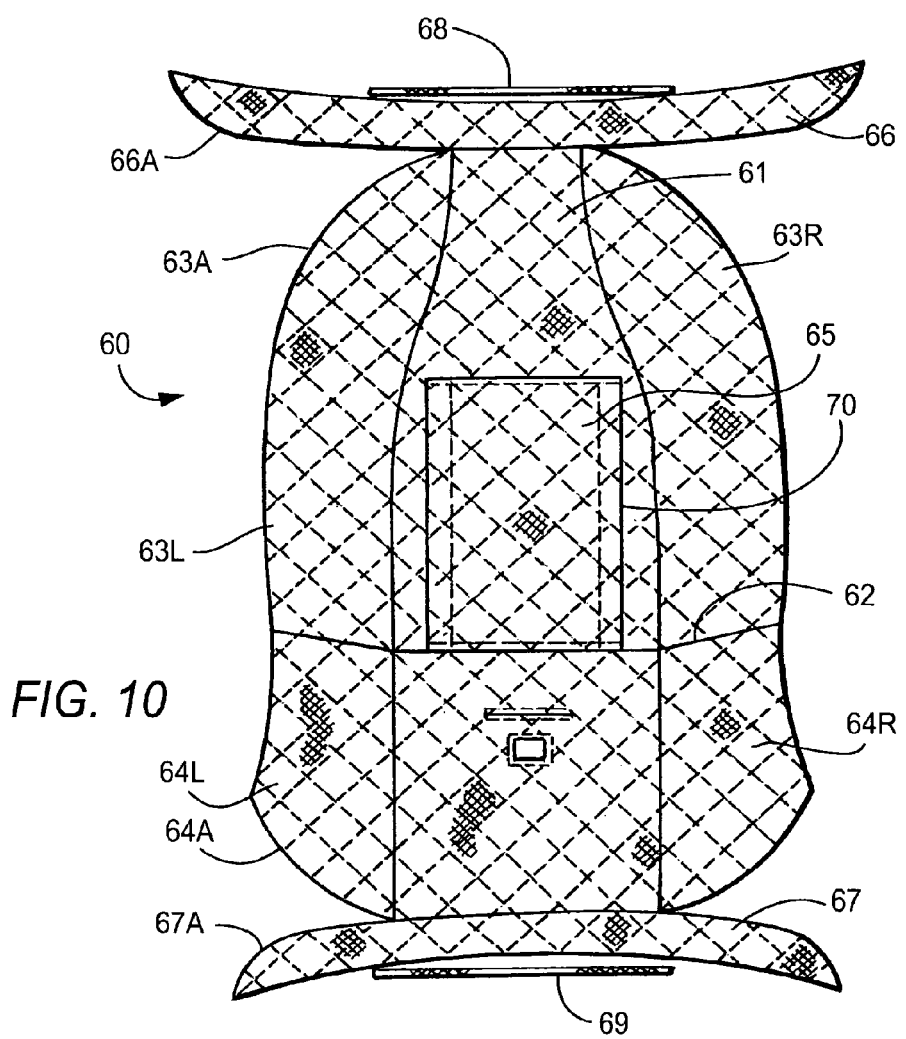

INFANT CAR SEAT COVER

CROSS-REFERENCE TO RELATED APPLICATIONS

This application claims priority under 35 U.S.C. §119, 120 and/or 365 to Provisional Application No. 61/210,640 filed Mar. 19, 2009.

I. BACKGROUND OF THE INVENTION

A. Field of the Invention

This invention is in the field of removable protective covers for infant car seats.

B. Prior Art

Infant car seats have become almost universally used, as the public has become aware of the great dangers for infant passengers who are not secured in standard car seats during a crash. Obviously, there are different commercial styles, sizes and qualities of infant car seats, but most share the common structural and functional features of being securable to the car by the car's standard seat belts and having their own set of straps or harness to hold the infant. The many known infant car seats also share the common experience of becoming frequently soiled by infants' spills from food and beverages and by fluids from infants' illnesses and/or body functions.

Protective and decorative covers, both permanent and removable, for these infant car seats are known, each type having its own set of benefits and deficiencies. For example, permanent covers are most difficult to clean since the car seat itself is usually very heavy, bulky and thus awkward to transport. Removable covers, some being form-fitting, may be quite difficult to remove from the car seat due to the arrangements of the car seat belts and the infant seat straps that extend through the fabric of the car seat cover. Of the removable infant car seat covers some are waterproof but not soft and comfortable for an infant to sit on for long periods, some others are soft and comfortable but not waterproof, and some lack an overall softness, absorbency and water impermeability that is currently desired.

C. Prior Art Patents

U.S. Pat. Nos. 4,883,701, 4,891,454 and 4,885,200 disclose disposable infant seat liners formed of a liquid permeable outer layer, an absorbent middle layer and a liquid impermeable inner layer, each having a complex shape including slots and cut-outs. These patents disclose constructions and methods of manufacture of fabric for infant seat liners, but their cost is increased due to the complex shaped panel components.

U.S. Pat. No. 6,428,098 discloses a generally rectangular child seat liner for an infant high chair using a fabric of permeable, absorbent and impermeable layers.

U.S. Pat. No. 6,959,963 discloses a disposable sanitary seat cover for use with public seat facilities such as shopping carts and high chairs in restaurants.

U.S. Pat. No. D525067 discloses a cover with a hood for a child safety seat showing an outer appearance without disclosure of construction or specific operation.

II. OBJECTS AND SUMMARY OF THE INVENTION

An object of the present invention is to provide a removable, washable protective cover for an infant safety car seat. A further object is to provide such a car seat cover made of a fabric that has a soft and liquid permeable front layer against which the infant sits, a waterproof remote bottom surface that lies against the infant car seat surface, and a liquid permeable and absorbent middle layer. One preferred embodiment will be constructed of a soft liquid permeable pongee fabric on the infant side, liquid absorbent polyester padding as the middle layer, and polyester waterproofed fabric on the car seat side.

An additional object is to construct the new seat cover of panel segments which are dimensioned and shaped to be easily joined to produce a generally flat and generally round or oval blank, which will easily conform to a conventional infant car seat when positioned thereon.

A still further object is to provide a seat cover defining a generally round or oval flat blank formed of a central panel that is generally rectangular, having opposite side edges, and adjacent each of said side edges a elongated segment panel with a remote convex curved edge, and adjacent each of said convex curved edge an outer panel of generally arc shape, all said panel segments being joinable at their mutually adjacent edges.

Another object is to use in the construction of such car seat a multi-layer fabric formed of a soft and absorbent Terry type layer for the outer surface, and a waterproof inner layer or as an inner layer that lies against the infant car seat, or an inner layer with a waterproof coating.

A still additional object is to provide such a car seat cover whose exposed outer surface is readily decoratable to please infants.

Another object is to provide such a car seat cover with a central window panel that is easily openable via Velcro® strips to allow access of the safety belt harness from the car seat.

These and other advantages of the invention will be further understood and appreciated by those skilled in the art by reference to the following written specification, claims and appended drawings.

III. BRIEF DESCRIPTION OF THE DRAWINGS

Figure 2:
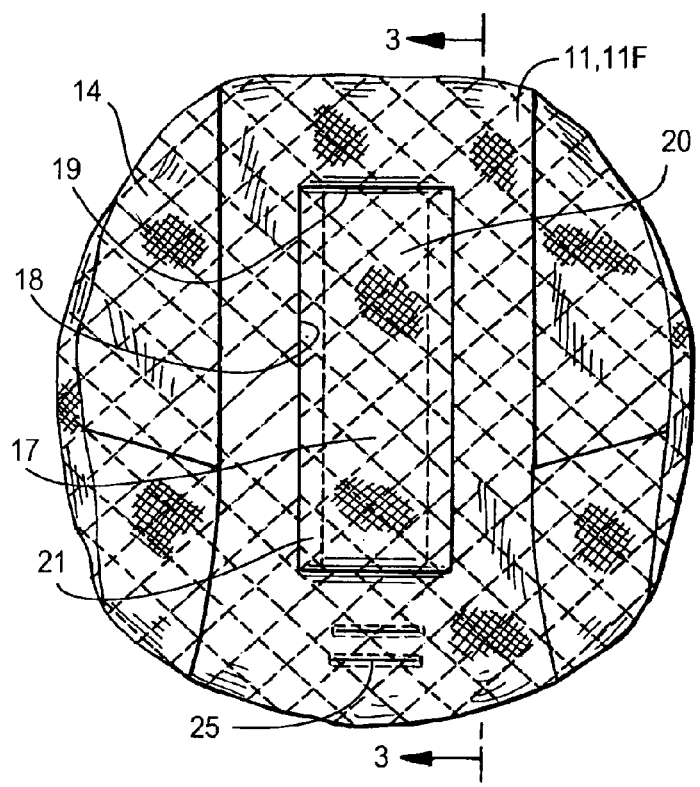
Figure 3:
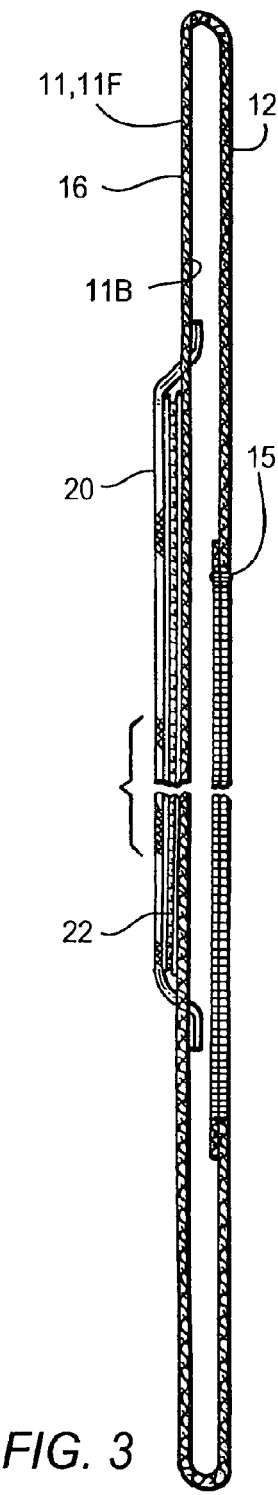
Figure 4A:
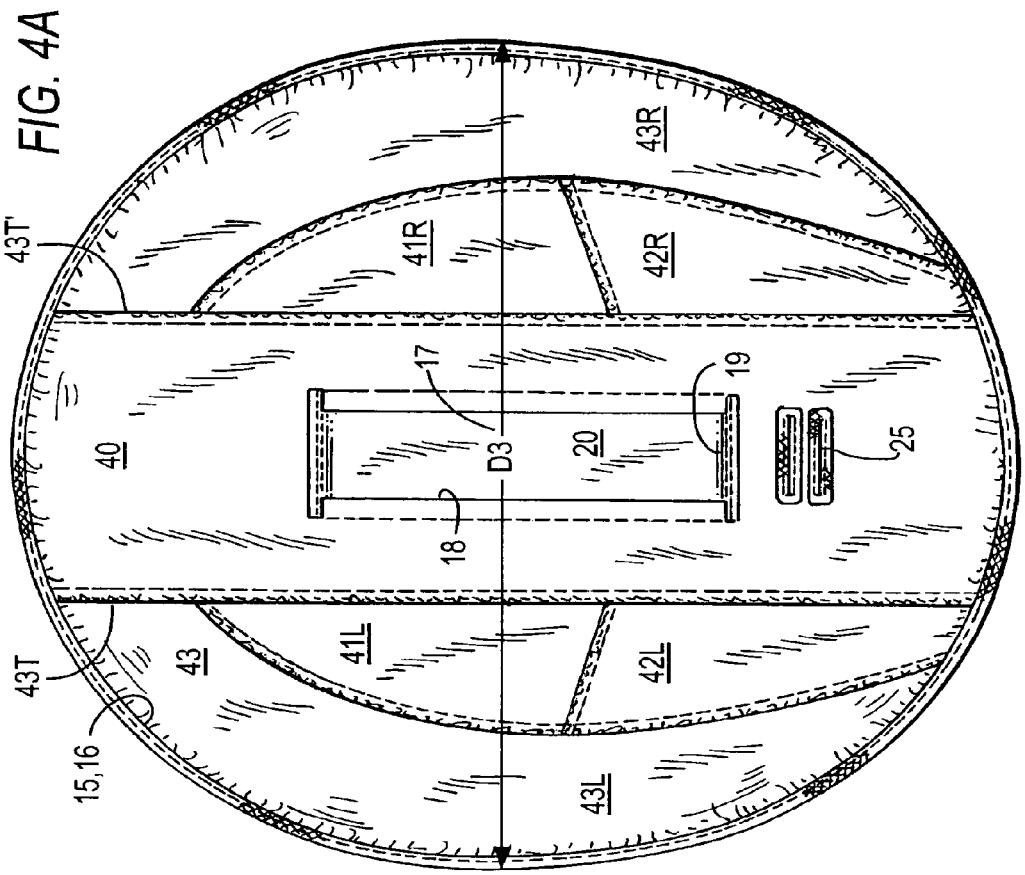
Figure 4:
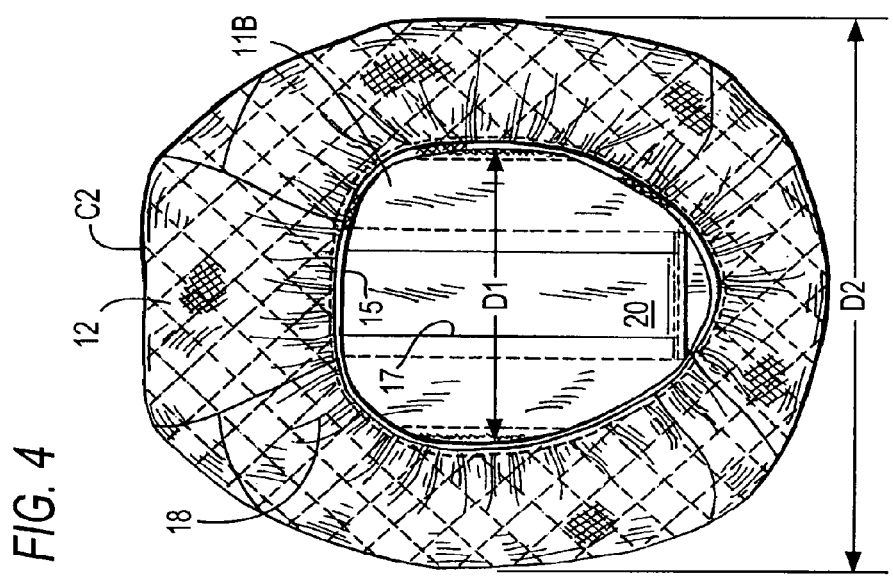
Figure 7:
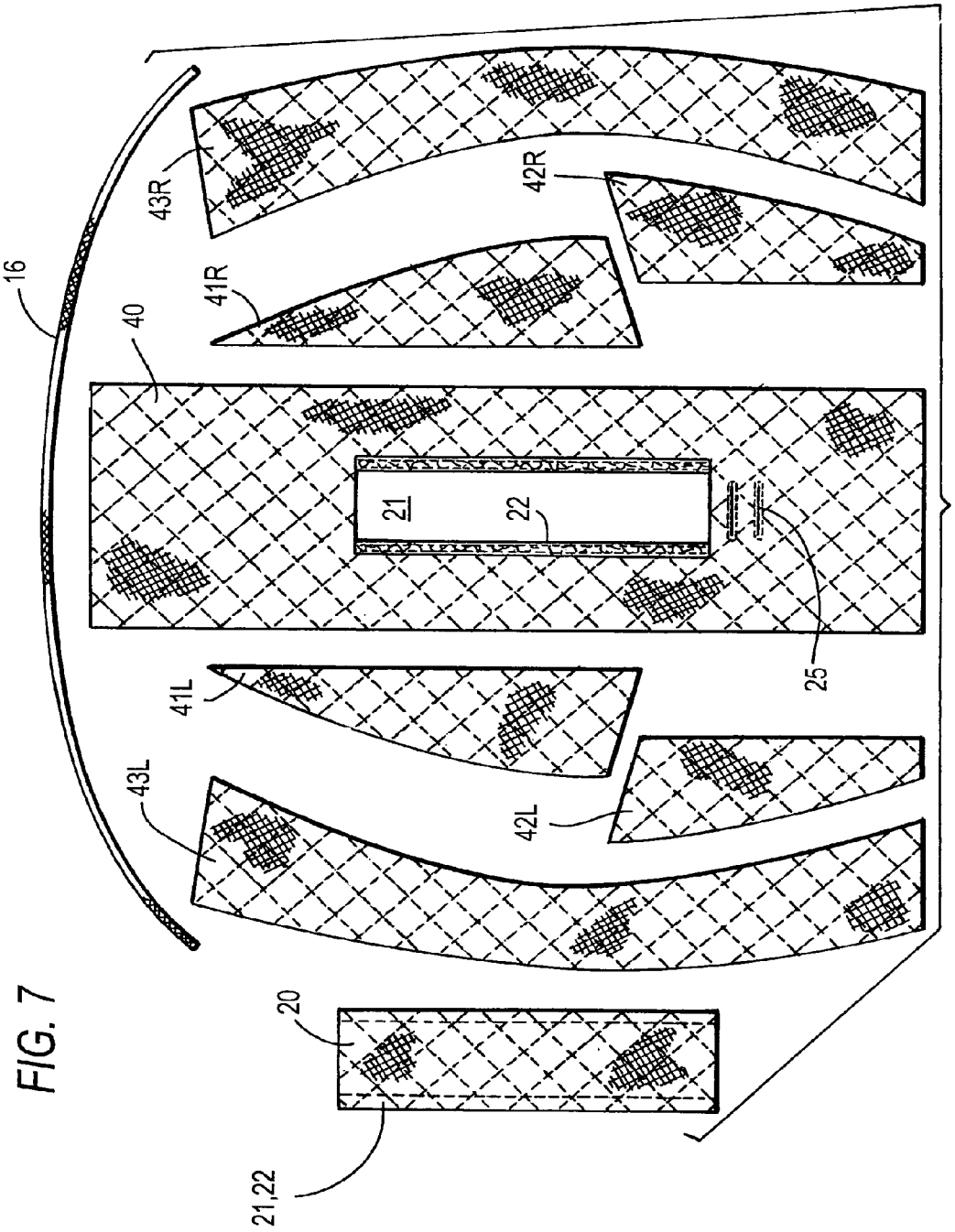

FIG. 1 is a top front perspective view of the new cover for an infant car seat shown, as removably attached to an infant car seat, FIG. 2 is a top plan view of the new cover of FIG. 1 with its elastic in contracted and relaxed state, FIG. 3 is a side elevation view thereof, FIG. 4 is a bottom plan view thereof, FIG. 4A is a bottom plan view of the cover of FIG. 4, shown with the elastic and fully stretched to its open state, FIG. 5 is a top plan view of the blank form of the cover, shown in flat condition with its component parts joined at their mutually adjacent edge and with the elastic band omitted, FIG. 6 is a side elevation view of the blank of FIG. 5, FIG. 7 is an exploded view of the blank form of the cover of FIG. 5, FIG. 8 is a fragmentary sectional view taken along line 8-8 in FIG. 7, FIG. 9 is a fragmentary perspective view of the fabric of the new cover for an infant car seat, and FIG. 10 is a top plan view of the blank form of a second embodiment of the new cover, shown in flat condition with its component parts joined at their mutually adjacent edges and with the peripheral elastic band omitted.

The features of the invention will become apparent from the following description of the exemplary embodiments taken in conjunction with the accompanying drawings.

IV. DETAILED DESCRIPTION OF THE PREFERRED EMBODIMENTS

The first embodiment of the new removable protective cover 10 for an infant car seat 1 is shown in FIGS. 1-9. As seen in FIG. 1 a new car seat cover 10 is secured on a conventional infant car seat 1 which is adapted to sit upon the generally horizontal part of a car seat and to lean against the generally upright part of said car seat, and to be releasably secured to said car seat by a conventional seat belt and buckle arrangement, the car seat, back, seat belt and buckle not shown.

As seen in FIGS. 1-4 the new infant car seat cover 10 is formed of a front or top generally oval wall 11 whose peripheral edge is folded as a rearward and radially inward extending flange or ring-shaped rear wall 12 that terminates in a hem of inner diameter D1. The hem contains an elastic band which allows the hem edge to stretch to a diameter D3 and circumference C3 to fit over an infant car seat 1 Front wall 11 has its front or top surface 11F on which the infant sits, and its back or bottom surface 11B that lies against and upon the infant car seat's exposed front and top surface.

When attached to a car seat the new cover 10 takes a concave dish-shape in order to fit into the top front recess area of car seat 1. Cover 10 is constructed of a set of pre-cut panel segments joined at their mutually adjacent edges, as will be described in detail later.

As seen in FIGS. 3,4 and 4A the rear wall 12 has a basic diameter D2 and corresponding circumference C2, and rearward and radially inward extending flange 12 with its peripheral edge 15 formed as a hem that encloses or engages an elastic band. The elastic band has a relaxed state where it can define a diameter D1 and circumference C1 as seen in FIG. 4, and a stretched state seen in FIG. 4A where it can expand to diameter D3 and circumference C3 when it is desired to install cover 10 onto an infant car seat 1. As further seen in FIG. 4, the rear wall 12 adjacent the inner peripheral edge 15 has folds or gathers 18 which allow the rear wall to open up partially or to its full diameter D3 when elastic band 16 is stretched. Cover 10 in this first embodiment is constructed of panels sewn or otherwise secured together which will be described in further detail below.

As seen in FIGS. 1-3 the front wall 11 includes an elongated window or opening 17 defined by side edges 18 and end edges 19 and correspondingly shaped window flap 20 having opposite side edges 21 (see FIGS. 7 and 3) which are releasably securable by Velcro® or other fastening means 22 to adjacent side edges 18. Window flap 20 can be pulled apart from window opening 17 to allow infant seat safety belt elements 23 (see FIG. 1) to extend through, then over the infant's shoulder or torso, and finally to engage the mating buckle element 24 (FIG. 1) to releasably secure the infant in car seat 1. Since the location and design of the mating buckle element 24 may vary on different infant car seats, cover 10 has optional opening slits 25 at different spaced locations to receive buckle element 23. After such belt engagement window flap 20 can be generally re-positioned to cover outer opening 17 with side edges and/or ends engaged to window opening edges to provide a neat and generally closed area to prevent or reduce spoiling the car seat or its original cover below the new cover 10. Window flap 20 at its top or bottom edge may optionally be fixed to or contiguous with front wall 11.

New cover 10 is formed of a fabric that absorbs liquid spills or soilage fluids and essentially bars such liquid or fluid from reaching the infant seat surface or from reaching the seat fabric beneath the new cover 10. As seen in FIG. 9, one preferred embodiment of cover 10 comprises a composite or laminate fabric 28 having an outer or top exposed layer 46 which is soft and comfortable to the touch, a bottom waterproof layer 47, and a middle padding absorbent layer, which may be spun polyester yarn, 48, which adds softness and body to the overall laminate. The preferred fabric includes spaced diagonal and intersecting lines of stitching to generally stabilize the middle layer between the top and bottom layers.

An example of the preferred fabric of the new infant car seat cover comprises:

a. for the top infant-side layer, a soft woven silky 100% polyester pongee liquid permeable fabric of 60G/M2 weight filament yarn, and 50D/72F DTY×50D/72 F DTY construction, b. for the middle padding layer, an absorbent 100% polyester liquid permeable and absorbent fabric of 40G/M2 weight filament yarn and 3D+6D construction, and c. for the car seat side layer, a 100% woven polyester fabric of 130G/M2 weight filament yarn, and 75 D/36F DTY construction that is liquid impermeable or has a liquid impermeable coating. The component layers described above have been known, but the decision to combine these particular layers into the laminate fabric for the particular use described herein is new. The present invention includes this disclosed embodiment and removable, washable infant car seat covers of polyester having substantially equivalent properties and characteristics.

As disclosed in FIGS. 2, 4, 4A, 5 and 7 removable seat cover 10 is constructed from the set of individual fabric panels, including central panel 40, a pair of upper left and right panels 41L, 41R, a pair of lower left and right panels 42L, 42R, a pair of outer left and right panels 43L, 43R, and previously described window panel or flap 20. Optionally, panels 41L and 42L could be combined into a single segment, and similarly 41R and 42R. FIG. 7 shows all these panel segments in an exploded view. FIG. 5 shows these panel segments generally as they are assembled in a flat state and joined at their mutually adjacent edges, except that top edge 43T of panel 43L is later moved to be adjacent to and joined to edge 40T of panel 40, and similarly 43T' is joined to 40T1 in order to create the generally oval shape and folded over rear wall 12. FIG. 7 includes also elastic band 16 which is secured in a hem 15 around the outer periphery, and has length in its relaxed state to produce the generally circular opening having diameter D1 seen in FIG. 4. As previously discussed this elastic band can stretch to establish a maximum opening defined by diameter D3 in FIG. 4A when cover 10 is installed onto an infant car seat. At the conclusion of installation this peripheral edge contracts back as much as possible at the bottom area of the infant car seat to secure it thereon.

FIG. 8 is a sectional view taken along line 8-8 in FIG. 5 for showing a typical junction 44 of adjacent edges of central panel 40 and right side panel 41R. In FIG. 5 the segment 45 of panel 40 has outer soft terry-type layer 46, inner waterproof layer 47 and middle spun layer 48. Also in FIG. 8 segment 50 of panel 41R has the same layers 46, 47 and 48.

FIG. 10 employing a graphic presentation generally similar to that of FIG. 5, illustrates a second preferred embodiment of the new infant car seat cover 60 which produces a more elongated design and is constructed of fewer panels. The fabric panel components are central upper panel 61, central lower panel 62, upper left and right panels 63L, 63R, lower left and right panels 64L, 64R, window panel 65, top neck panel 66, bottom neck panel 67, top elastic band 68 and bottom elastic band 69. Top neck panel's edge 66A is joined to edge 63A of upper left panel 63L and the opposite side is similarly arranged. Elastic bands 68 and 69 are secured in hems along peripheral edges of neck panels 66 and 67 respectively.

Mutually adjacent edges are joined similarly as described above in connection with the new car seat cover of FIGS. 1-9.

Window panel 65 is attached to central upper panel 61 by Velcro® fastener strips 70 on opposite side edges, similarly as seen in FIGS. 2, 5 and 7.

The embodiments described herein are more generally defined as follows.

1. A washable infant car seat cover adapted to removably fit over and onto an infant car seat which includes a safety belt, said cover comprising:
   a. a generally oval central part with a peripheral edge of circumference C2,
   b. a flange folded rearwardly and radially inwardly from said peripheral edge of said central part and terminating in a hem of circumference C1<C2,
   c. an elastic band extending around and secured in said hem,
   d. said elastic band in its relaxed state causing said hem to have a circumference C1<C2, said elastic band in its stretched state allowing said hem to expand to a circumference C3>C2,
   e. said central part further defining therein a centrally located elongated opening having top and bottom ends and opposite sides, to allow forward passage therethrough of said safety belt, and
   f. a flap adapted to cover said window while allowing said safety belt through said window,
   g. said cover formed of a three-layer fabric, comprising:
      (i) a top layer to be sat on by an infant formed of a soft 100% polyester liquid permeable fabric,
      (ii) a middle padding layer formed of a soft 100% polyester liquid permeable and absorbent fabric, and
      (iii) a bottom layer formed of 100% woven polyester liquid impermeable fabric,
   said three layers being secured together by intersecting lines of stitching extending through all three layers.

2. An infant car seat cover according to claim 1 wherein said top layer comprises a 60G/M2 weight filament yarn, said middle layer comprises a 40G/M2 weight filament yarn, and said bottom layer comprises a 130G/M2 weight filament yarn.

3. An infant car seat cover according to claim 2 wherein said top layer comprises 50D/72F DTY×50D/72 F DTY construction, said middle layer comprises 3D+6D construction, and said bottom layer comprises 75D/36F DTY construction.

4. An infant car seat cover according to claim 1 wherein said bottom layer comprises a liquid-impermeable coating on its outer surface.

5. An infant car seat cover formed of a set of fabric panels which together define a generally oval shape, comprising:
   a. a central panel of generally rectangular shape with generally parallel side edges, and a centrally located opening cut therein coverable by a flap,
   b. a pair of elongated inner side panels, each having (i) a generally straight near side joined to each of said side edges of said central panel, and (ii) an opposite arcuate convex curved outer edge, and
   c. a pair of outer panels each having a concave inner edge joined to said convex outer edge of one of said inner side panels, and a free outer edge,
   d. said inner side panels and said outer panels each having length which is less than the length of said central panel.

6. An infant car seat cover according to claim 5 wherein each of said panels is formed of a three-layer fabric comprising:
   (i) a top layer to be sat on formed of a soft 100% polyester liquid permeable fabric,
   (ii) a middle padding layer formed of a soft 100% polyester liquid permeable and absorbent fabric, and
   (iii) a bottom layer formed of 100% woven polyester liquid impermeable fabric,
   said three layers being secured together by intersecting lines of stitching extending through all three layers.

7. An infant car seat cover according to claim 5 wherein each of said outer panels has one end curved toward and joined to a portion of said side edge of said central panel.

8. An infant car seat cover according to claim 5 wherein said cover comprises:
   a. a generally oval central part with a peripheral edge of circumference C2,
   b. a flange folded rearwardly and radially inward from said peripheral edge of said central part and terminating in a hem of circumference C1<C2,
   c. an elastic band extending around and secured to said hem, said elastic band in its relaxed state causing said hem to have a circumference C1<C2, said elastic band in its stretched state allowing said hem to expand to a circumference C3>C2, said central part further defining therein a centrally located elongated opening having top and bottom ends and opposite sides, to allow forward passage there through of said safety belt, and
   d. a flap adapted to cover said window while allowing said safety belt through said window.

9. A washable infant car seat cover adapted to removably fit over and onto an infant car seat which includes a safety belt, said cover comprising:
   a. a generally oval central part with a peripheral edge of circumference C2,
   b. a flange folded rearwardly and radially inwardly from said peripheral edge of said central part and terminating in a hem of circumference C1<C2,
   c. an elastic band extending around and secured in said hem,
   d. said elastic band in its relaxed state causing said hem to have a circumference C1<C2, said elastic band in its stretched state allowing said hem to expand to a circumference C3>C2,
   e. said central part further defining therein a centrally located elongated opening having top and bottom ends and opposite sides, to allow forward passage therethrough of said safety belt, and
   f. a flap adapted to cover said window while allowing said safety belt through said window,
   g. said cover formed of a three-layer fabric, comprising:
      (i) a bottom layer formed of woven polyester liquid impermeable fabric,
   said three layers being secured together by intersecting lines of stitching extending through all three layers.

One preferred construction of new cover 10 employs a set of differently sized and shaped panels which when joined at mutually adjacent edges form the final shape of removable cover 10 that is easily applied onto a conventional infant car seat.

While the invention has been described in conjunction with several embodiments, it is to be understood that many alternatives, modifications, and variations will be apparent to those skilled in the art in light of the foregoing description. Accordingly, this invention is intended to embrace all such alternatives, modifications, and variations which fall within the spirit and scope of the appended claims.

The invention claimed is:

1. A washable infant car seat cover adapted to removably fit over and onto an infant car seat which includes a safety belt, said cover comprising:
   a. a generally oval central part with a peripheral edge of circumference C2, b. a flange folded rearwardly and radially inwardly from said peripheral edge of said central part and terminating in a hem of circumference $C1<C2$, c. an elastic band extending around and secured in said hem, d. said elastic band in its relaxed state causing said hem to have a circumference $C1<C2$, said elastic band in its stretched state allowing said hem to expand to a circumference $C3>C2$, e. said central part further defining therein a single centrally located elongated opening having top and bottom ends and opposite sides, to allow forward passage therethrough of said safety belt, and f. a flap adapted to cover said opening while allowing said safety belt through said opening, g. said cover formed of a three-layer fabric, comprising:
   (i) a top layer to be sat on by an infant formed of a soft 100% polyester liquid permeable fabric,
   (ii) a middle padding layer formed of a soft 100% polyester liquid permeable and absorbent fabric, and
   (iii) a bottom layer formed of 100% woven polyester liquid impermeable fabric, said three layers being secured together by intersecting lines of stitching extending through all three layers.

2. The infant car seat cover according to claim 1 wherein said top layer comprises a 60G/M2 weight filament yarn, said middle layer comprises a 40G/M2 weight filament yarn, and said bottom layer comprises a 130G/M2 weight filament yarn.

3. The infant car seat cover according to claim 2 wherein said top layer comprises 50D/72F DTY×50D/72 F DTY construction, said middle layer comprises 3D+6D construction, and said bottom layer comprises 75D/36F DTY construction.

4. The infant car seat cover according to claim 1 wherein said bottom layer comprises a liquid-impermeable coating on its outer surface.

5. An infant car seat cover formed of a set of fabric panels which together define a generally oval shape, comprising:

a. a central panel formed of a single panel element of generally rectangular shape with generally parallel side edges, and a single centrally located opening cut therein coverable by a flap, b. a pair of elongated inner side panels, each having (i) a generally straight near side joined to each of said side edges of said central panel, and (ii) an opposite arcuate convex curved outer edge, and c. a pair of outer panels each having a concave inner edge joined to said convex outer edge of one of said inner side panels, and a free outer edge, d. said inner side panels and said outer panels each having length which is less than the length of said central panel and wherein each of said panels is formed of a three-layer fabric comprising:
   (i) a top layer to be sat on formed of a soft 100% polyester liquid permeable fabric,
   (ii) a middle padding layer formed of a soft 100% polyester liquid permeable and absorbent fabric, and
   (iii) a bottom layer formed of 100% woven polyester liquid impermeable fabric, said three layers being secured together by intersecting lines of stitching extending through all three layers.

6. The infant car seat cover according to claim 5 wherein each of said outer panels has one end curved toward and joined to a portion of said side edge of said central panel.

7. The infant car seat cover according to claim 5 wherein said cover comprises:

a. a generally oval central part with a peripheral edge of circumference C2, b. a flange folded rearwardly and radially inward from said peripheral edge of said central part and terminating in a hem of circumference $C1<C2$, c. an elastic band extending around and secured to said hem, said elastic band in its relaxed state causing said hem to have a circumference $C1<C2$, said elastic band in its stretched state allowing said hem to expand to a circumference $C3>C2$, said central part further defining therein a single centrally located elongated opening having top and bottom ends and opposite sides to allow forward passage therethrough of said safety belt, and d. a flap adapted to cover said opening while allowing said safety belt through said opening.

8. A washable infant car seat cover adapted to removably fit over and onto an infant car seat which includes a safety belt, said cover comprising:

a. a generally oval central part with a peripheral edge of circumference C2, b. a flange folded rearwardly and radially inwardly from said peripheral edge of said central part and terminating in a hem of circumference $C1<C2$, c. an elastic band extending around and secured in said hem, d. said elastic band in its relaxed state causing said hem to have a circumference $C1<C2$, said elastic band in its stretched state allowing said hem to expand to a circumference $C3>C2$, e. said central part further defining therein a single centrally located elongated opening having top and bottom ends and opposite sides, to allow forward passage therethrough of said safety belt, and f. a flap adapted to cover said opening while allowing said safety belt through said opening, g. said cover formed of a three-layer fabric, comprising:
      (i) a top layer to be sat on by an infant formed of a soft 100% polyester liquid permeable fabric,
      (ii) a middle padding layer formed of a soft 100% polyester liquid absorbent fabric, and
      (iii) a bottom layer formed of woven polyester liquid impermeable fabric, said three layers being secured together by intersecting lines of stitching extending through all three layers.

* * * * *